United States Patent [19]
Tarolli

[11] Patent Number: 5,657,047
[45] Date of Patent: Aug. 12, 1997

[54] METHOD AND APPARATUS FOR ZOOMING IMAGES ON A VIDEO DISPLAY

[75] Inventor: Gary M. Tarolli, Concord, Mass.

[73] Assignee: AccelGraphics, Inc., San Jose, Calif.

[21] Appl. No.: 386,742

[22] Filed: Feb. 10, 1995

Related U.S. Application Data

[63] Continuation-in-part of Ser. No. 371,932, Jan. 12, 1995, abandoned.

[51] Int. Cl.⁶ ................................................ G09G 5/00
[52] U.S. Cl. ........................ 345/127; 345/130; 395/139
[58] Field of Search .................... 395/102, 139, 395/134; 345/127, 130, 185; 398/451

[56] References Cited

U.S. PATENT DOCUMENTS

| | | | |
|---|---|---|---|
| 4,070,710 | 1/1978 | Sukonick et al. | 364/900 |
| 4,107,664 | 8/1978 | Marino | 340/324 |
| 4,197,590 | 4/1980 | Sukonick et al. | 364/900 |
| 4,314,244 | 2/1982 | Demke et al. | 345/130 |
| 4,747,154 | 5/1988 | Suzuki et al. | 395/139 |
| 5,150,461 | 9/1992 | Reynolds | 395/164 |
| 5,175,808 | 12/1992 | Sayre | 395/133 |
| 5,237,432 | 8/1993 | Calarco et al. | 358/451 |
| 5,276,787 | 1/1994 | Searby | 395/132 |

FOREIGN PATENT DOCUMENTS 3939 110 A1   5/1990   Germany .

OTHER PUBLICATIONS

Shandle, Jack, No–Frills Compression Delivers Low–Cost PC Video, Electronic Design, pp. 37–41, Mar. 4, 1993.

Epranian, Brad, Zooming In On Full–Screen Video, PC Magazine, p. 31, May 31, 1994.

Shandle, Jack, Image–Resizing IC Delivers Highest Possible Fidelity, Electronic Design, May 27, 1993, pp. 129–131.

Mosley, J.D., PCs Become Low–Cost Imaging Systems, EDN Magazine Edition, pp. 81–86 and 88, Aug. 3, 1989.

Cole, Bernard C., Brooktree Eyes Multimedia, Electronic Engineering Times, pp. 1, 118, Oct. 31, 1994.

ZOOMDAC ™, Datasheets for Zoomdac #W30C516, pp. 1–38; Application note, pp. 1–12, Sep. 1994.

Application Note, "Accessing the ZOOMDAC™ Registers", IC Works, Nov. 10, 1994, pp. 1–12.

IC Works Inc. Product Selection Guide, Mar.1995 (4 pages).

ZOOMDAC™ Product Brochure, "ZOOMDAC™ Video for the Masses," (6 pages).

Edelson, et al., "Mixing Graphics and Video Poses Design Challenges", Electronic Engineering Times, Jun. 27, 1994.

Primary Examiner—Richard Hjerpe
Assistant Examiner—Amare Mengistu
Attorney, Agent, or Firm—Blakely, Sokoloff, Taylor & Zafman LLP

[57] ABSTRACT

An apparatus and method for enlarging a source image on a computer display is described. A scanline buffer stores pixels in a first row of the source image. Coordination circuitry receives from a processor and stores pixels in a second row of the source image. Blend circuitry generates output pixels, such that each of the output pixels corresponds to a weighted average of a plurality of input pixels. The plurality of input pixels comprises two pixels stored in the scanline buffer and two pixels stored in the coordination circuitry. Control circuitry determines weight values and provides the weight values to the blend circuitry for calculating the weighted average. The control circuitry also determines, based on the weight values, which pixels stored in the scanline buffer and in the coordination circuitry are used by the blend circuitry as the input pixels. In addition, the control circuitry replaces the pixels in the scanline buffer with corresponding pixels from the coordination circuitry after the last time the pixels in the scanline buffer are used as the input pixels.

31 Claims, 13 Drawing Sheets

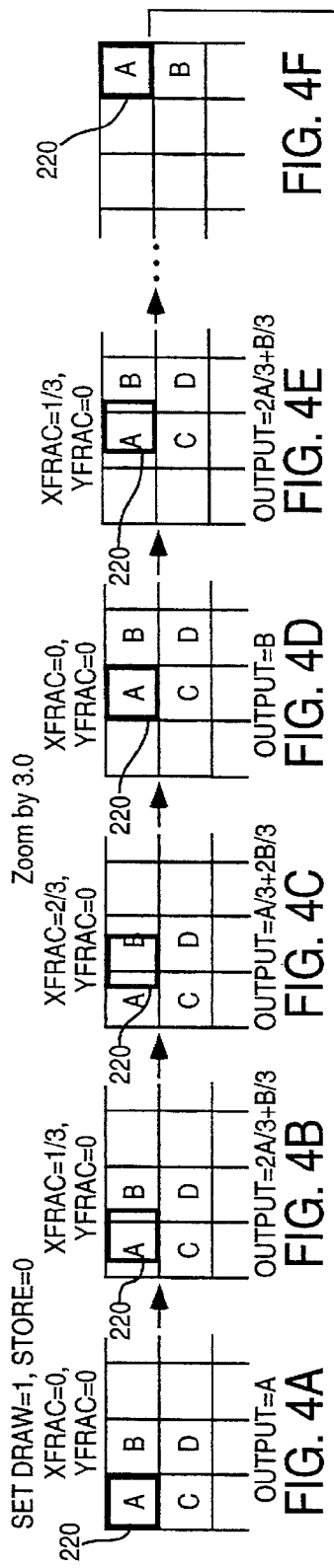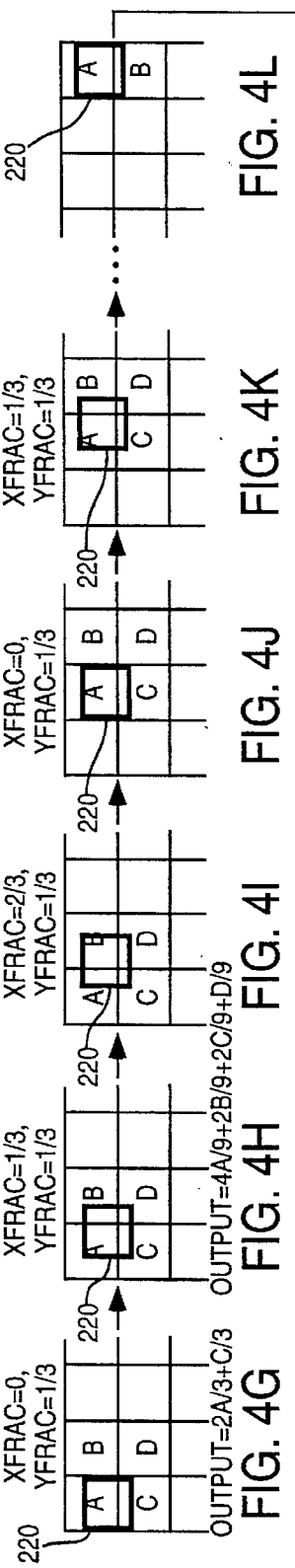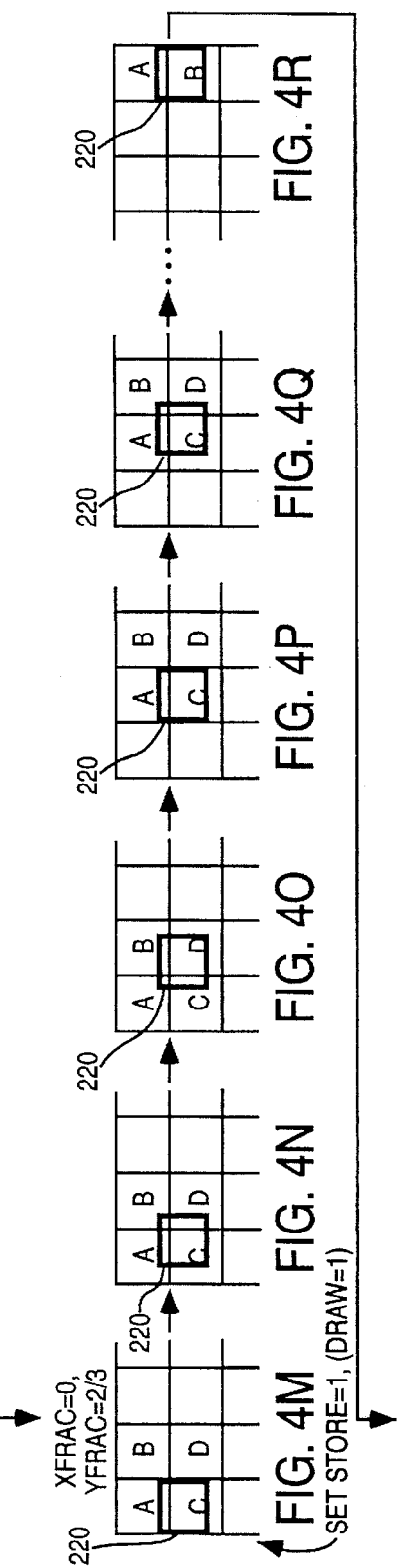

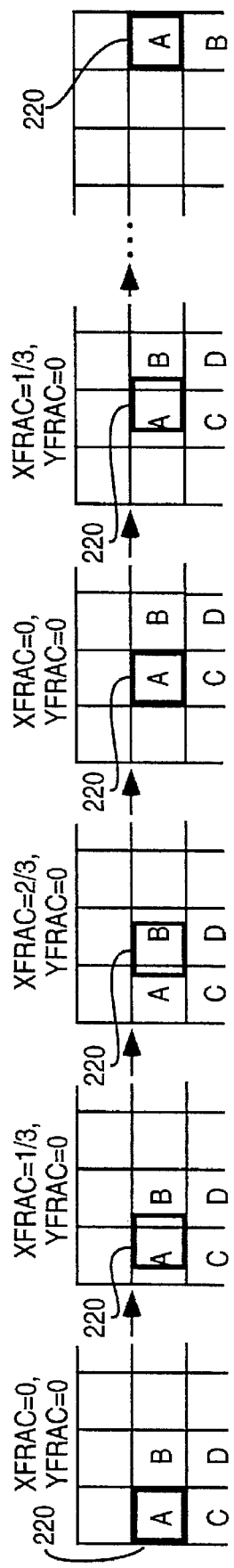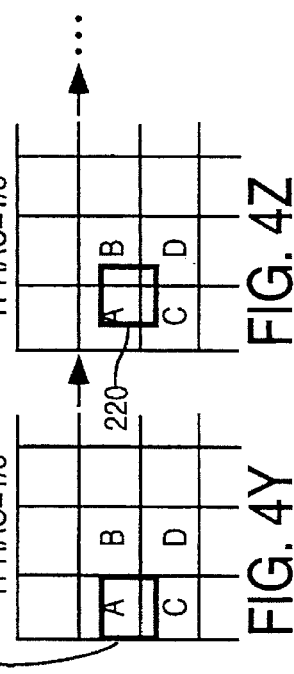

FIG. 8A
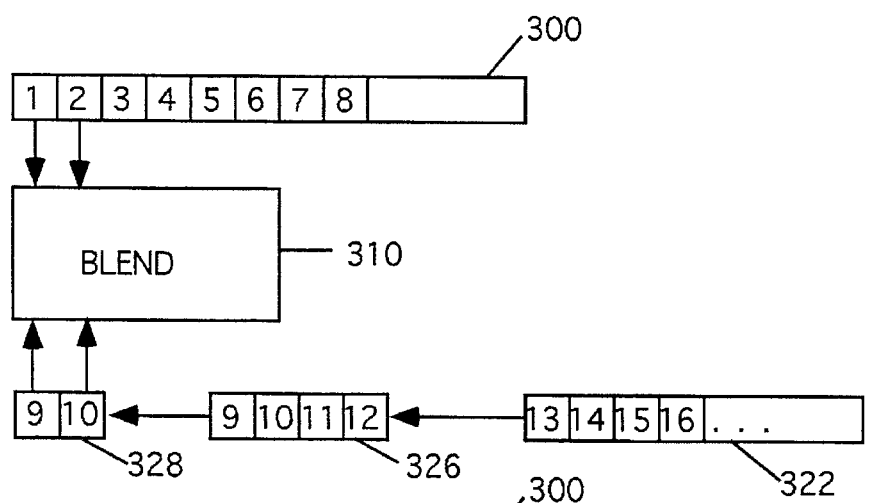
FIG. 8B
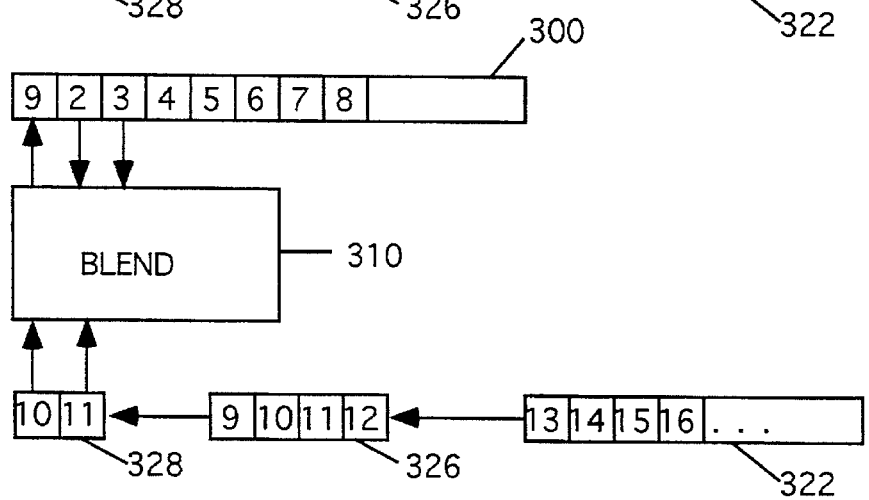
FIG. 8C

P = # OF PIXELS IN A SOURCE IMAGE ROW
R = # OF OUTPUT ROWS TO BE GENERATED

METHOD AND APPARATUS FOR ZOOMING IMAGES ON A VIDEO DISPLAY

This is a continuation-in-part of application Ser. No. 08/371,932, filed Jan. 12, 1995 now abandoned, for "A Method and Apparatus for Enlarging Images on a Video Display".

FIELD OF THE INVENTION

The present invention pertains to the field of computer graphics systems. More particularly, the present invention relates to enlarging, or zooming, an image on a video display device.

BACKGROUND OF THE INVENTION

One field in which computers often excel is the area of graphical arts. The speed, processing power, memory, and cost of computer systems are often ideally suited for simulation and display of models of concrete or abstract objects. Computer generated models are useful because they can give users the capability to visualize and comprehend the structure of a particular object or the interaction and relationships between a group of objects or data. Computer graphics can also make interaction between the user and a computer more convenient. For example, changes to data can be accomplished by inputting the desired modifications to the computer, which then implements those changes and modifies the display accordingly.

In a typical computer system having graphics capability, an image generated by the computer is displayed by a monitor. The monitor is comprised of a screen having an array of picture elements, known as pixels. Each pixel represents a dot on the screen and is assigned a value representing a particular color or intensity. A displayed image may be formed by many rows of pixels, each row having multiple pixels. The intensity values of each individual pixel in the image are stored in a frame buffer. The frame buffer is a digital memory for storing the image to be displayed as a set of binary values. Furthermore, a video processor chip can be implemented for processing the image data to be displayed.

In some situations, there is a need to enlarge, or "zoom", an image displayed by a monitor. For example, a doctor might wish to examine a specific portion of a displayed diagnostic scan in greater detail. Accordingly, he may enlarge the area of interest, which will be referred to as the "source image". One concern in the design of a computer is the factor by which the source image is to be enlarged, the zoom factor. Some prior art systems use the technique of replication of pixels to implement the zooming function. For example, if the user wished to zoom the source image by a factor 3, the system would produce three identical output pixels for each pixel in the source image. This type of replication does not work, however, for a non-integral zoom factor, such as 3.5. For non-integral zoom factors, various techniques may be used. One such technique is the blending of pixels. Blending involves taking a weighted average of the intensities of two or more pixels in the source image to produce one output pixel. Blending may be combined with replication or other techniques in some systems in order to accommodate non-integral zooming.

Another design concern is that a graphics processor may not be capable of enlarging the entire source image in one step. Instead, the graphics processor may process each individual pixel multiple times depending upon the desired zoom factor. For a zoom factor of 3, the graphics processor may require access to each pixel in the source image 3 times. Consequently, zooming is sometimes accomplished by storing the source image in memory located within the graphics processor so that the graphics processor can access the source image repeatedly using minimal communication with the host processor. However, providing enough memory in the graphics processor to store the source image may cause the graphics processor to become expensive. Alternatively, zooming may be accomplished by repeatedly sending portions of the source image from the host processor to the graphics processor instead of storing the source image on the graphics processor. For large zoom factors, however, this technique may result in excessive traffic on the system data bus, which may cause a slowing of the computer's performance which is perceptible to the user.

SUMMARY OF THE INVENTION

The present invention pertains to an apparatus and method for enlarging a source image on a computer display. The apparatus comprises a scanline buffer, coordination circuitry, blend circuitry, and control circuitry. The scanline buffer is for storing pixels in a first row of the source image. The coordination circuitry is for receiving from a processor and for storing pixels in a second row of the source image. The blend circuitry, which is coupled to the scanline buffer and the coordination circuitry, is for generating output pixels, such that each of the output pixels corresponds to a weighted average of a plurality of input pixels. The plurality of input pixels comprises two pixels stored in the scanline buffer and two pixels stored in the coordination circuitry. The control circuitry, which is coupled to the scanline buffer, the coordination circuitry, and the blend circuitry, is for determining weight values and for providing the weight values to the blend circuitry for calculating the weighted average. In addition, the control circuitry is for determining, based on the weight values, which pixels stored in the scanline buffer and in the coordination circuitry are used by the blend circuitry as the input pixels. Further, the control circuitry is for replacing the pixels in the scanline buffer with corresponding pixels from the coordination circuitry after the last time the pixels in the scanline buffer are used as the input pixels.

Other features of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements and in which:

FIGS. 4A through 4Z show a representation of a sequence of output pixels being generated in accordance with the present invention.

FIGS. 8A through 8E show a sequence of pixels being replaced in a scanline buffer in an apparatus for enlarging an image on a video display.

DETAILED DESCRIPTION

In view of the design concerns noted above, it is desirable to provide a graphics subsystem which is capable of performing both integral and non-integral zooming. In addition, it is desirable to provide a graphics subsystem which provides integral and non-integral zooming in a manner which reduces the amount of resident memory required in the graphics processor while also reducing data traffic on the system bus.

An apparatus and method for enlarging images on a video display is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

1. Overview of the System Architecture

Figure 1:
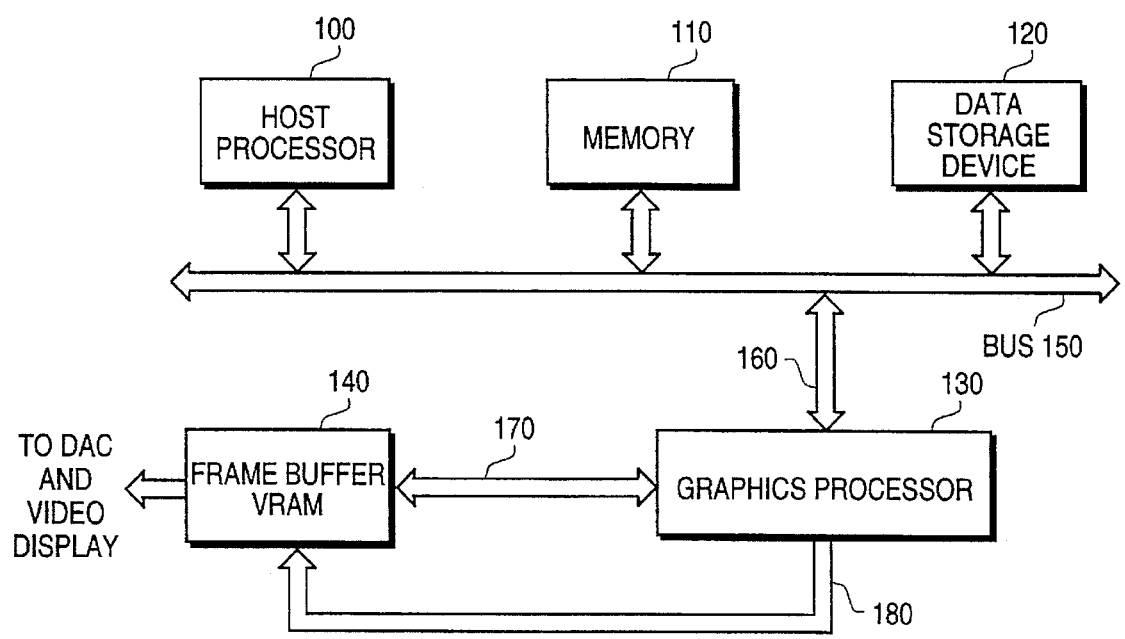
FIG. 1 shows an example of a computer system having a graphics subsystem.

FIG. 1 shows a computer system having a graphics subsystem. The computer system comprises a host processor 100, a memory 110, a data storage device 120, a graphics processor 130, and a frame buffer 140. In this system, image data from the host processor 100 is communicated to the graphics processor 130 over bus 150 and bus 160, both of which are 32 bits wide. The graphics processor 130 receives image data from the host processor 100 and uses that image data to create an image which is rendered by using well known graphic techniques. The resulting image is stored by the graphics processor 130 in the frame buffer 140, which is a video random access memory (VRAM). The graphics processor 130 addresses the frame buffer 140 over the address bus 170 while supplying the video information over bus 180. Periodically, the output of the frame buffer 140 is read out to a digital to analog (DAC) converter and then to a video display device or to other raster scan display devices.

2. Overview of the Zoom Method

Figure 2:
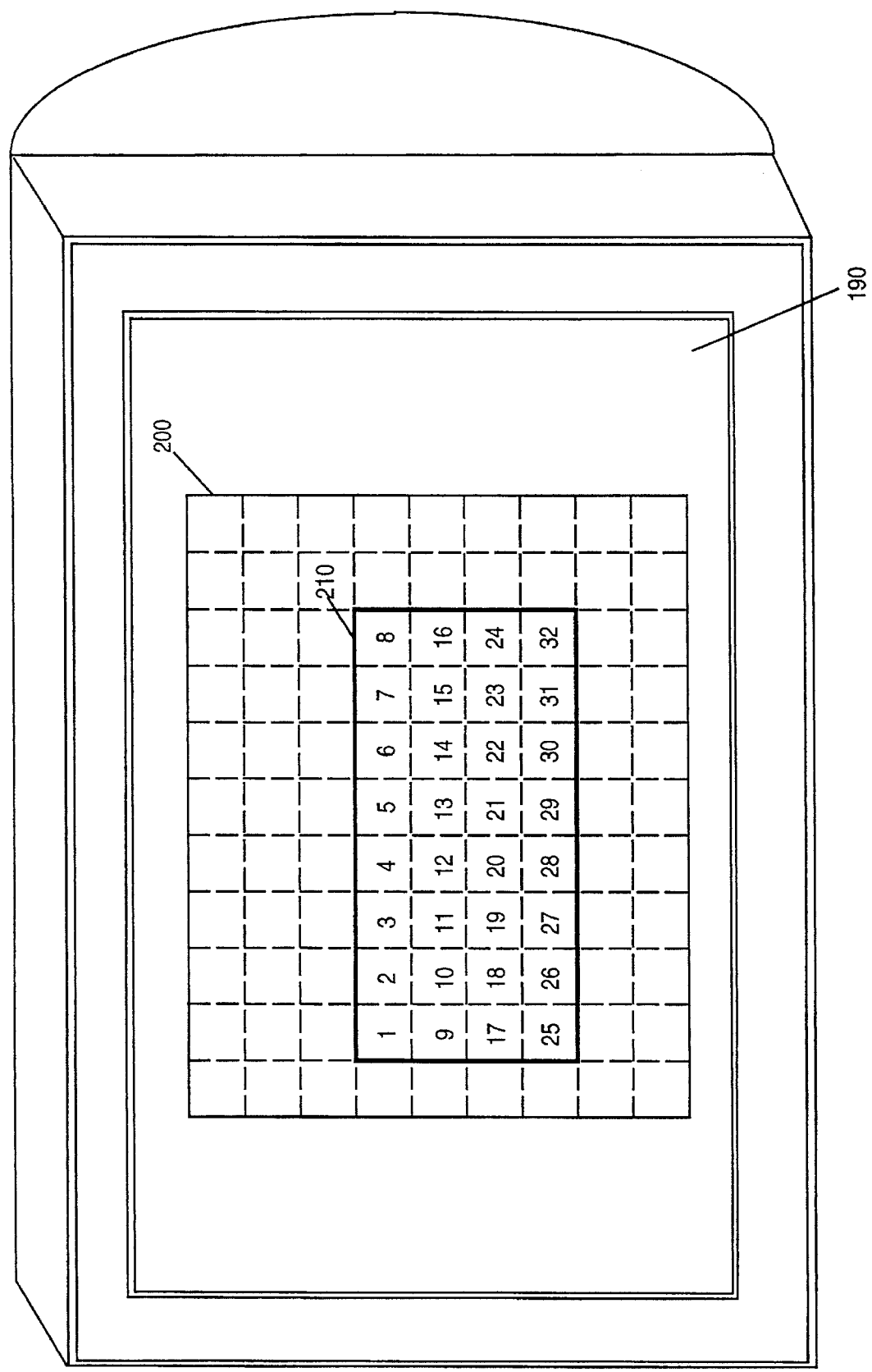
FIG. 2 shows a video display on which an image to be enlarged is displayed.
Figure 3:
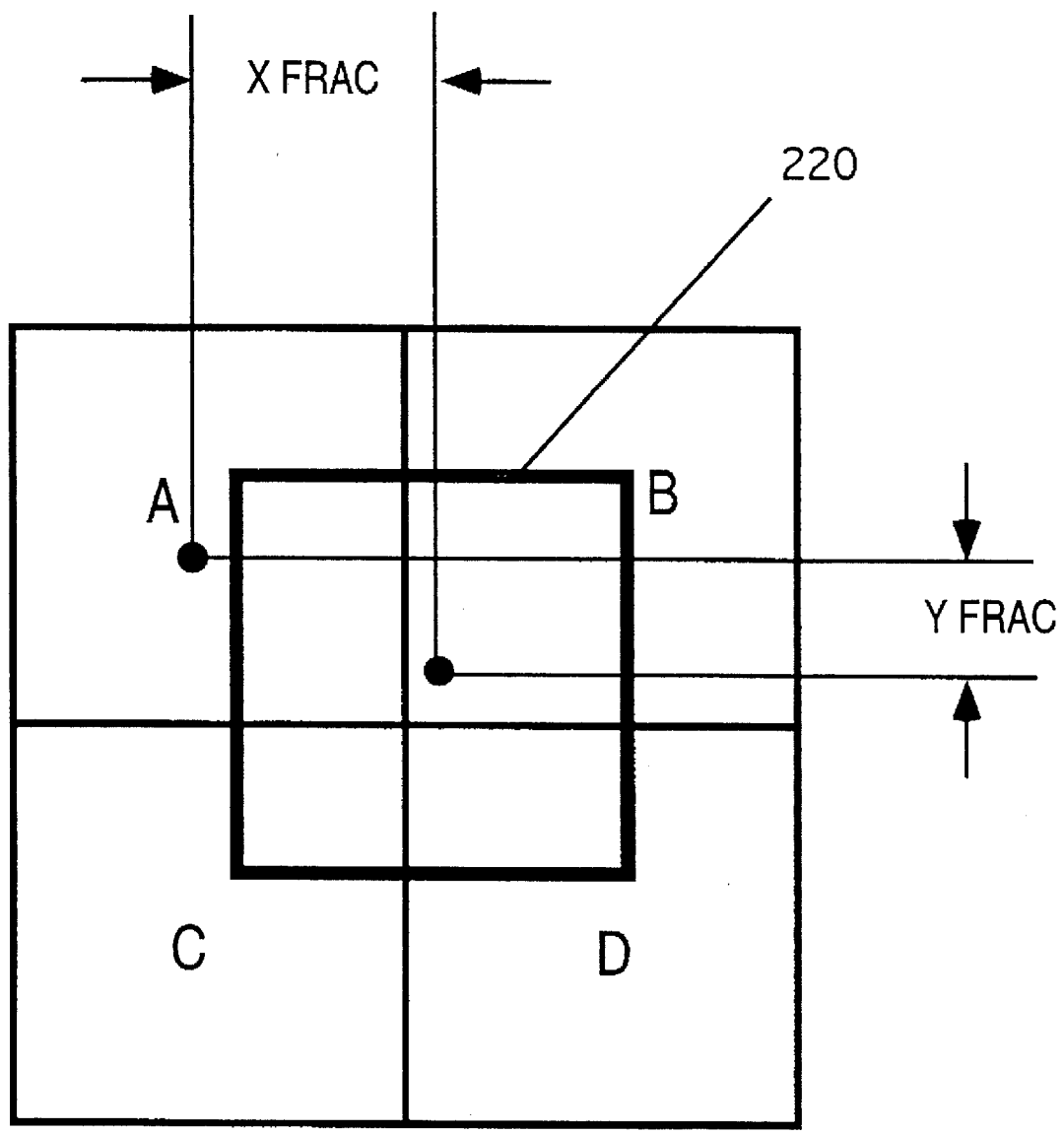
FIG. 3 shows four pixels of an image to be enlarged.

FIG. 2 shows a video display 190 which is displaying a complete image 200 that is stored in memory. A portion of the complete image 200 is defined herein as the source image 210, which is the portion of the complete image 200 which is to be enlarged, or "zoomed". The source image 210 may be selected by the user by drawing a "zoom window" with a mouse or a similar I/O device. The source image 210 comprises individual pixels 1 through 32. The pixels in the source image 210 may be grouped into multiple blocks of pixels, as shown in FIG. 3. Each block consists of four input pixels designated A, B, C and D, based on their position within the block. Zooming is accomplished through a method designated as bilinear zooming. Bilinear zooming is a form of blending wherein one output pixel is produced for the block of four input pixels A, B, C and D. The intensity of the output pixel is a weighted average of the intensity of pixels A, B, C and D. Specifically, an output pixel is generated according to the equations:

$$T1 = A + Yfrac(C-A) \quad (1)$$

$$T2 = B + Yfrac(D-B) \quad (2)$$

$$OUTPUT = T1 + Xfrac(T2-T1) \quad (3)$$

wherein:

A represents the intensity of pixel A;
B represents the intensity of pixel B;
C represents the intensity of pixel C;
D represents the intensity of pixel D;
Xfrac represents a horizontal component of the weight to be attributed to the input pixels;
Yfrac represents a vertical component of the weight to be attributed to the input pixels; and
OUTPUT represents the intensity of the output pixel.

During the zoom operation, Xfrac and Yfrac are repeatedly incremented by values which are derived from the zoom factor. More specifically, Xfrac is incremented by a value Xfrac_incr, which is the reciprocal of the factor by which the source image 210 is to be enlarged horizontally, while Yfrac is incremented by a value Yfrac_incr, which is the reciprocal of the factor by which the source image 210 is to be enlarged vertically. For example, if the source image 210 is to be enlarged by a factor of 3 horizontally and by a factor of 10 vertically, Xfrac_incr would be ⅓ and Yfrac_incr would be ⅒. The values Xfrac, Xfrac_incr, Yfrac, and Yfrac_incr are actually implemented as fixed point decimal numbers (i.e., 0.3333 or 0.1000). However, these values are treated in this description as fractional numbers for ease of explanation.

FIGS. 4A through 4Z show a conceptual representation of a sequence of output pixels being generated for a symmetrical zoom by 3. For descriptive purposes, an output pixel may be thought of as a conceptual "window" 220 over the source image 210. Xfrac and Yfrac indicate the horizontal and vertical "position" of the window 220 with respect to input pixels A, B, C, and D. In FIGS. 4A through 4Z, the window 220 is superimposed upon input pixels A, B, C and D of the source image 210. Each of FIGS. 4A through 4Z corresponds to the generation of one output pixel. The intensity of the output pixel is computed according to equations (1) through (3) above, such that the respective areas of input pixels A, B, C and D covered by the window 220 represent the relative weights attributed to each of those input pixels. For example, in FIG. 4A the output intensity would be the intensity of pixel A. In FIG. 4B the output intensity would be: (⅔)(intensity of pixel A)+(⅓)(intensity of pixel B). In FIG. 4H the output intensity would be: (⅑)(intensity of pixel A)+(⅔)(intensity of pixel B)+(⅔)(intensity of pixel C)+(⅑) (intensity of pixel D).

Xfrac and Yfrac each vary between the values of 0 and 1 by increments of Xfrac_incr and Yfrac_incr, respectively. (The initial values for Xfrac and Yfrac are assumed to be 0 in the example of FIG. 4; however, this need not be the case. If the user chooses a source image for zooming which includes only portions of some pixels, then Xfrac and/or Yfrac will have non-zero initial values.) In a symmetrical zoom by 3, Xfrac_incr and Yfrac_incr both equal ⅓. Each time an output pixel is produced, Xfrac is incremented by Xfrac_incr. Accordingly, as illustrated in FIG. 4B, when Xfrac=⅓ and Yfrac=0, the window 220 has moved to the right by ⅓ of a pixel. When Xfrac equals or exceeds 1, the window 220 has moved one pixel to the right in the source image 210 and Xfrac is recomputed by subtracting 1, as illustrated by FIG. 4D. Accordingly, each time Xfrac equals or exceeds 1, input pixels A, B, C and D change to represent a different block of pixels in the source image 210. Specifically, pixel A changes to represent the pixel of the source image 210 which was previously represented by pixel B, while pixel C changes to represent the pixel of the source image 210 which was previously represented by pixel D.

Similarly, pixel B changes to represent the pixel immediately to the right of the pixel previously represented by pixel B, while pixel C changes to represent the pixel immediately to the right of the pixel previously represented by pixel C. Hence, one output pixel is generated for each increment of Xfrac.

Each time the window 220 falls directly upon the last pixel in a row of the source image 210, as illustrated in FIG. 4F, the host processor increments Yfrac by Yfrac_incr and resets Xfrac to its initial value. Consequently, the four input pixels A, B, C and D change again to represent different pixels in the source image 210, as illustrated in FIG. 4G. Each time Yfrac equals or exceeds 1, Yfrac is recomputed by subtracting 1, and a different two rows of the source image 210 are used as input in the blending process. Specifically, the block of input pixels A, B, C and D moves down one row in the source image 210, as illustrated in FIG. 4S. This process is repeated until the window 220 has passed over the entire area of the source image 210 and each pixel in the source image 210 has been used in generating output pixels. (It should be noted that, in the actual implementation, a rectangle clipper is used to define the boundaries of the output image. Consequently, not every pixel of the source image will necessarily be used to generate output, as will be discussed further below.)

For non-integral zoom factors, the process is similar. However, an extra output pixel is periodically generated to provide the non-integral portion of the zoom factor. For example, for a requested zoom factor of 10.2, ten output pixels are generated for each sequence of Xfrac varying from 0 to 1 for the first four sequences of Xfrac varying from 0 to 1 (i.e., the first four input pixels). On the fifth sequence of Xfrac varying from 0 to 1, one extra output pixel is generated. The extra output pixel generated produces the 0.2 portion of the requested 10.2 zoom factor. The overall effect is an average zoom factor of 10.2 for the entire output image.

3. Description of the Zoom Apparatus

Figure 5:
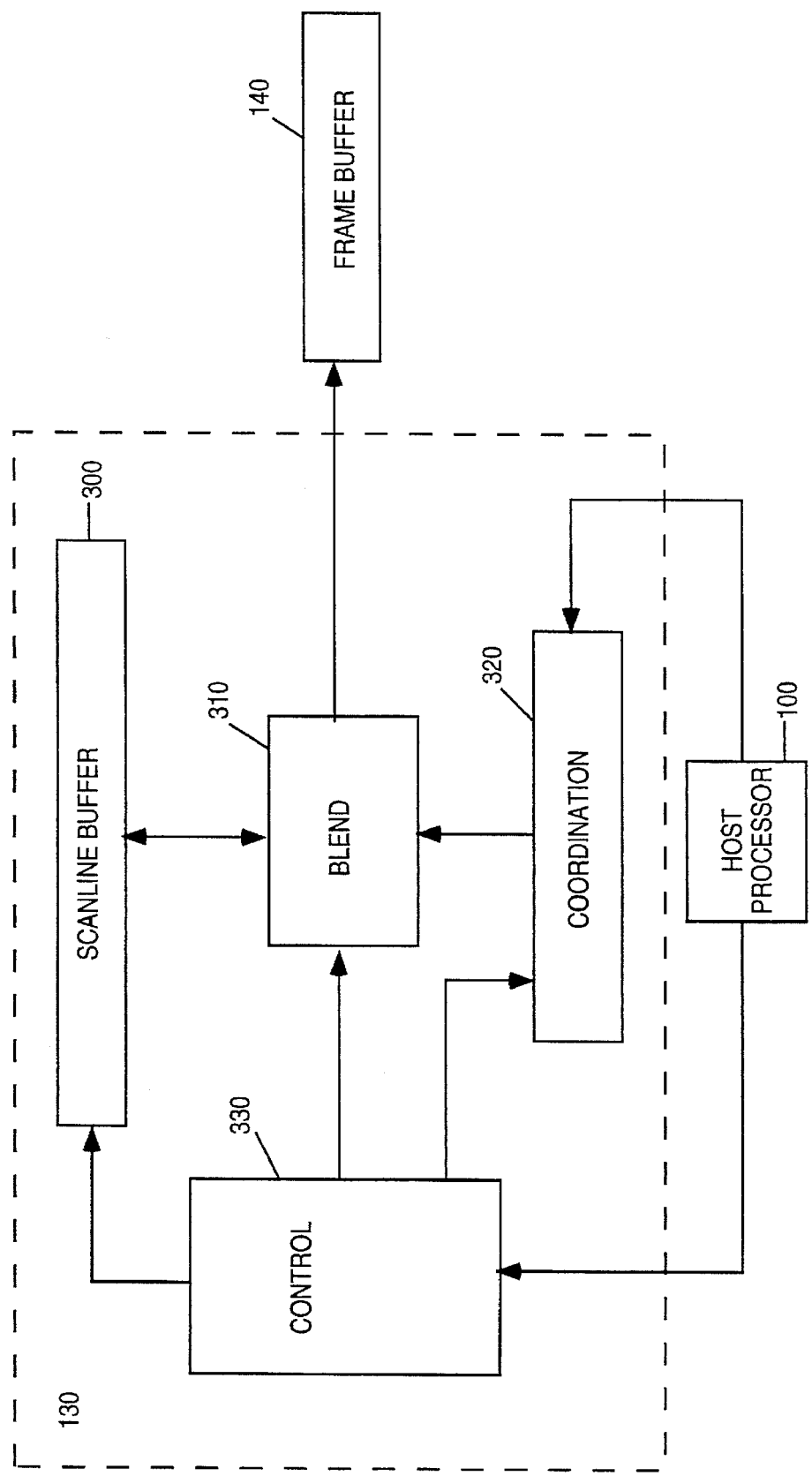
FIG. 5 shows an apparatus for enlarging an image on a video display.

The above described method is implemented by the apparatus depicted in FIG. 5. The graphics processor 130 comprises a scanline buffer 300 for storing one row of pixels of the source image 210. The scanline buffer 300 is capable of storing 1024 16-bit pixel intensity values. Coupled to the scanline buffer 300 is blend circuitry 310, which generates output pixel intensities based on the weighted average of pixels A, B, C and D, as set forth in equations (1) through (3). The blend circuitry 310 then provides these output intensities to the frame buffer 140. The physical details of the blend circuitry 310 are unimportant for purposes of this description and can be easily supplied by one skilled in the art. The blend circuitry 310 receives the intensity values of pixels A and B from the scanline buffer 300. Coupled to the blend circuitry 310 is coordination circuitry 320, which receives packed pixel data from the host processor 100. The coordination circuitry 320 coordinates the timing of data transfer between the host processor 100 and the blend circuitry 310. The coordination circuitry 320 also supplies intensity values of pixels C and D to the blend circuitry 310. In addition, storage of pixel data in the scanline buffer 300 is accomplished by sending each row of the source image 210 from the host processor 100 through both the coordination circuitry 320 and the blend circuitry 310 to the scanline buffer 300. Control circuitry 330 is coupled to the scanline buffer 300, the blend circuitry 310 the coordination circuitry 320, and the host processor 100. The control circuitry 330 contains storage space for the values Xfrac and Yfrac, increments Xfrac, and directs the transfer of pixel data between the host processor 100, the coordination circuitry, the blend circuitry 310, and the scanline buffer 300.

Figure 6:
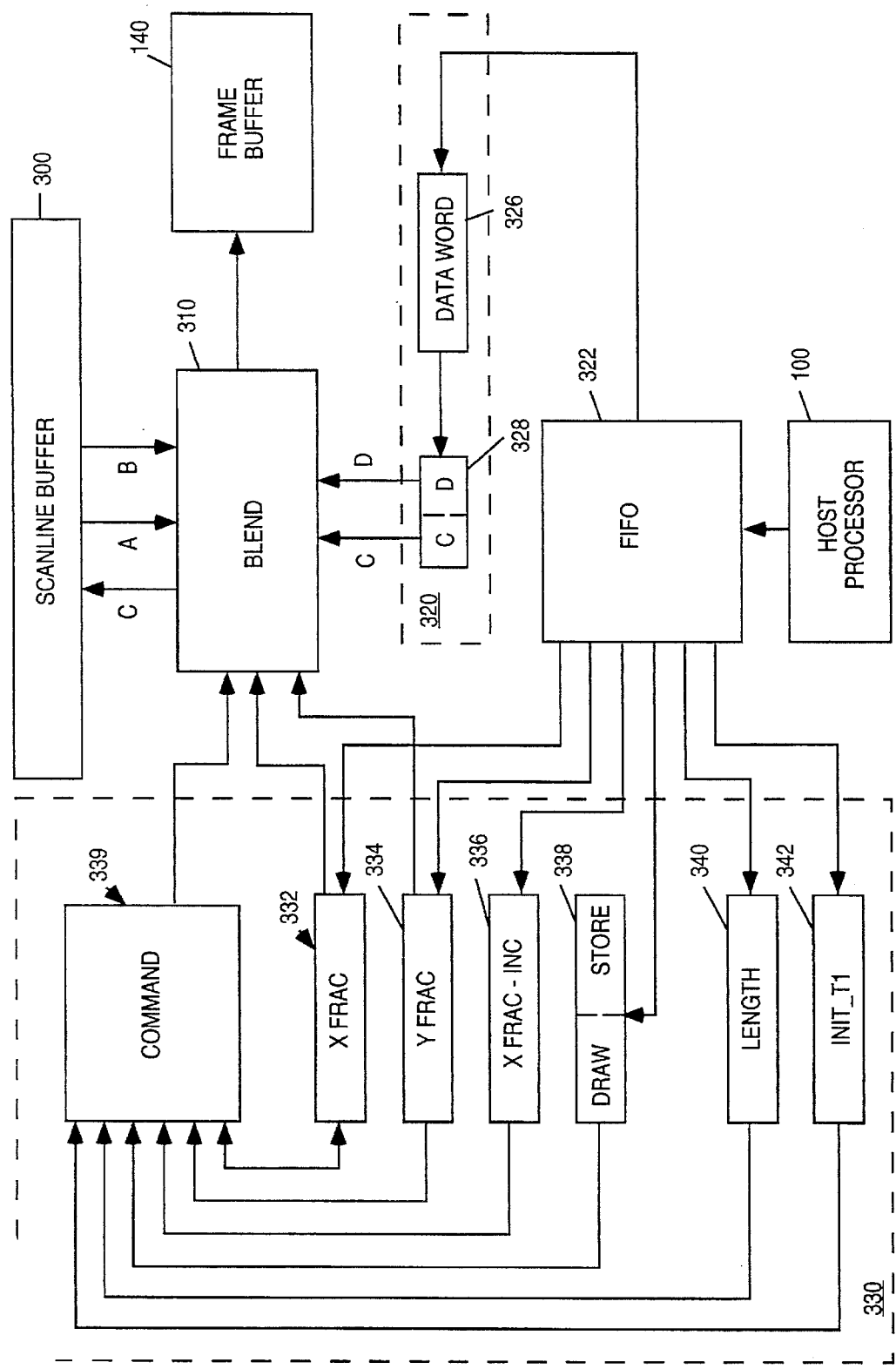
FIG. 6 shows in greater detail the apparatus depicted in FIG. 5.

FIG. 6 depicts the apparatus of FIG. 5 in more detail. The coordination circuitry 320 comprises a first in-first out (FIFO) memory 322, a data word register 326, and a C-D register 328. The FIFO 322 receives source image pixel intensities from the host processor 100. The data word register 326 receives this pixel data from the FIFO 322 one data word at a time. Each data word consists of 32 bits of pixel data, which is based on the 32 bit width of buses 150 and 160. However, those skilled in the art will recognize that the present invention may be practiced using buses having widths other than 32 bits. The illustrated embodiment may be operated in 8-bit mode, such that each pixel is represented by an 8-bit intensity value, or in 16-bit mode, such that each pixel is represented by a 16-bit intensity value. Accordingly, the data word register 326 is capable of storing 4 pixels of the source image 210 in 8-bit mode, or two pixels of the source image 210 in 16-bit mode. The C-D register 328 is coupled to the data word register 326 and the blend circuitry 310. The C-D register 328 receives from the data word register 326 and stores two source image 210 pixel intensifies at a time—the intensities of input pixels C and D. The C-D register 328 then provides these pixel intensities to the blend circuitry 310.

The control circuitry 330 comprises an Xfrac register 332 for storing the value Xfrac, a Yfrac register 334 for storing the value Yfrac, an Xfrac_incr register 336 for storing the value Xfrac_incr, a control register 338, command circuitry 339, a LENGTH register 340, and an INIT_T1 register 342. The command circuitry 339 causes the value in the Xfrac register 332 to be incremented based on the value in the Xfrac_incr register 336 and directs data transfer between the host processor 100, the coordination circuitry 320, the blend circuitry 310, and the scanline buffer 300, as will be described in more detail below. The control register 338 comprises two bits, a DRAW bit and a STORE bit, the values of which are determined by the host processor 100. The command circuit directs data transfer based on the values of the DRAW bit and the STORE bit. The INIT_T1 register 342 stores the initial value for T1 from equation (1) for each scanline and is set at the beginning of each scanline.

The LENGTH register 340 is provided to store the number of pixels in the first data word which are to be used in the zooming process. As described above, each data word may contain either two or four pixels, depending upon whether 16-bit or 8-bit mode is used. Since the left boundary of the source image 210 may not coincide directly with the edge of a data word, the number of pixels in the first data word that are actually contained within the source image word must be provided to the control circuitry 330. Accordingly, LENGTH register 340 is provided to store that value.

4. Operation of the Zoom Apparatus

Figure 7A:
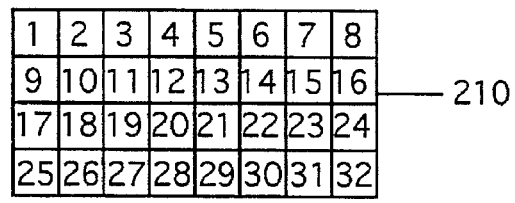
FIGS. 7A through 7E show a sequence of data transfers in coordination circuitry in an apparatus for enlarging an image on a video display.
Figure 9A:
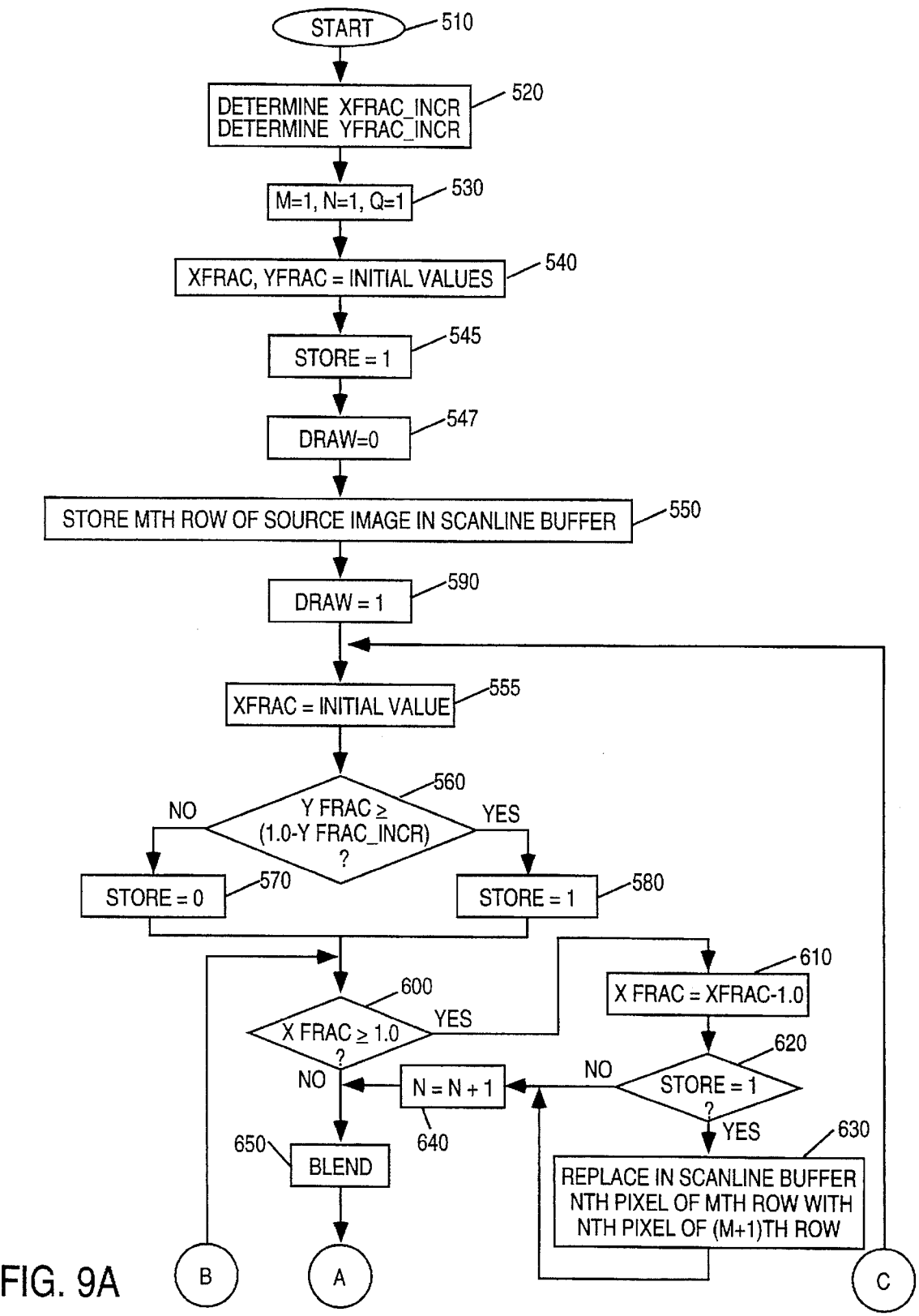
FIGS. 9A and 9B show a flowchart of a method of enlarging an image on a video display.
Figure 9B:
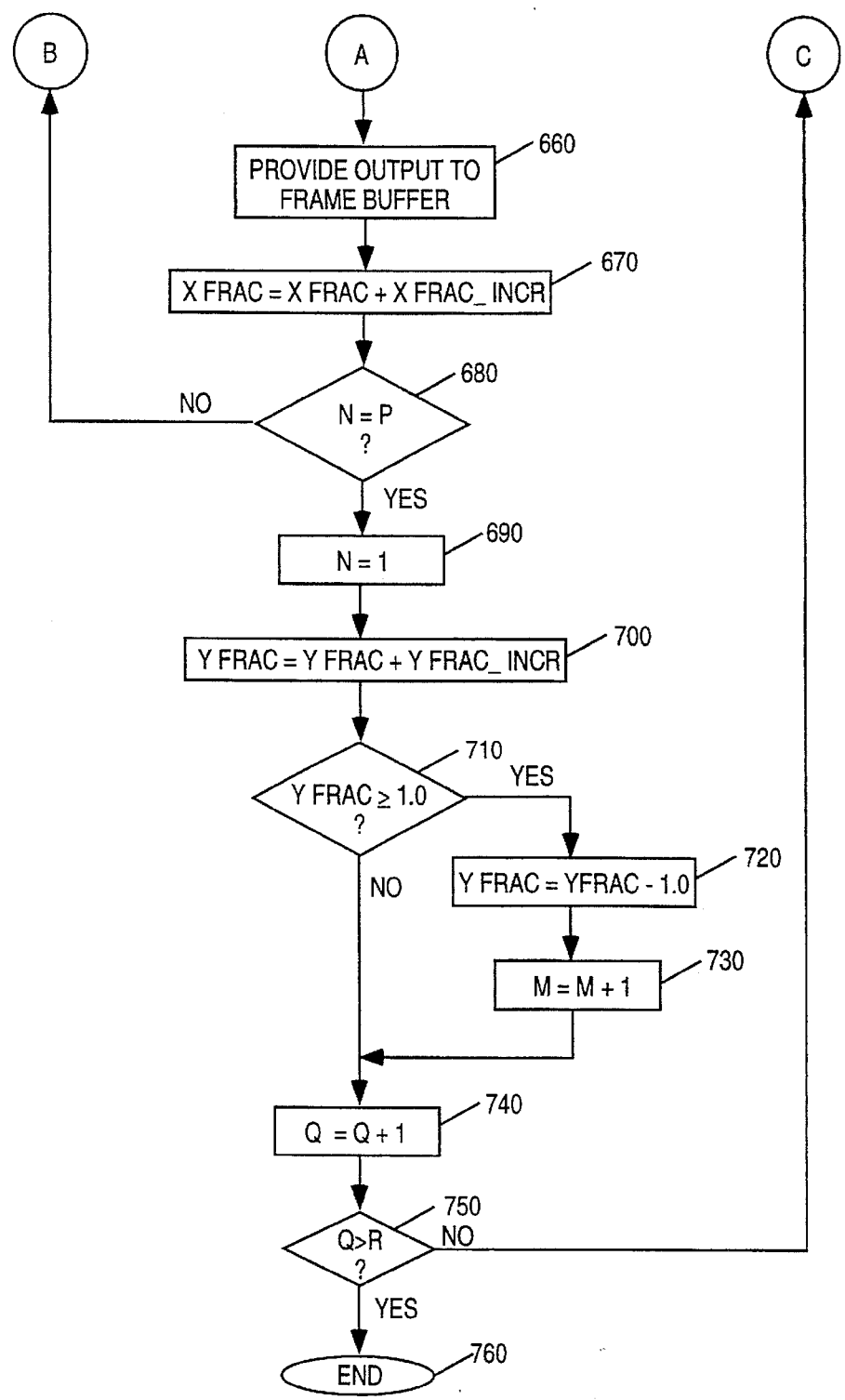

Referring to FIG. 7A, the source image 210 is an example of a particular image to be enlarged. The source image 210 consists of pixels 1 through 32. Each row of pixels in source image 210 consists of eight pixels, such that row one consists of pixels 1 through 8, row two consists of pixels 9 through 16, and so forth. FIGS. 9A and 9B provides a general illustration of the described method (steps 510–760) as carried out by the described apparatus. FIGS. 9A and 9B are intended to be only a general, conceptual level illustration to facilitate understanding of the operation of the present invention; it is not intended to represent a precise description of the system's operation.

Referring to FIG. 7 and to FIGS. 9A and 9B, when a zoom operation is requested by the user, the host processor 100 first supplies initial values for Xfrac, Yfrac, Xfrac_incr, and Yfrac_incr to the appropriate registers (steps 520 and 540).

Next the host processor 100 sets the STORE bit in the control register 338 to 1 (step 545). The host processor 100 then loads the FIFO 322 with pixels from the first row of the source image 210. In response, the command circuitry 339 causes the first row of pixels in the source image 210 to be passed from the FIFO 322 through the data word register 326, the C-D register 328, and the blend circuitry 310 to the scanline buffer 300, where it is received and stored (step 550). Hence, pixels 1 through 8 of the source image 210 are loaded into the scanline buffer 300.

The step 550 of storing the first row of source image pixels in the scanline buffer actually comprises the following substeps. First, the LENGTH register 340 is set to the number of pixels in the first data word of the first row which are within the source image. The command circuitry then reads this value and loads that number of pixels from the first data word into the scanline buffer from left to right. Next, the host processor resets the LENGTH register 340 to the value 4 for 8-bit mode or the value 2 for 16-bit mode. The remainder of the pixels in the first row are then loaded into the FIFO 322 by the host processor 100 and then, in turn, into the scanline buffer 300.

Figure 7B:
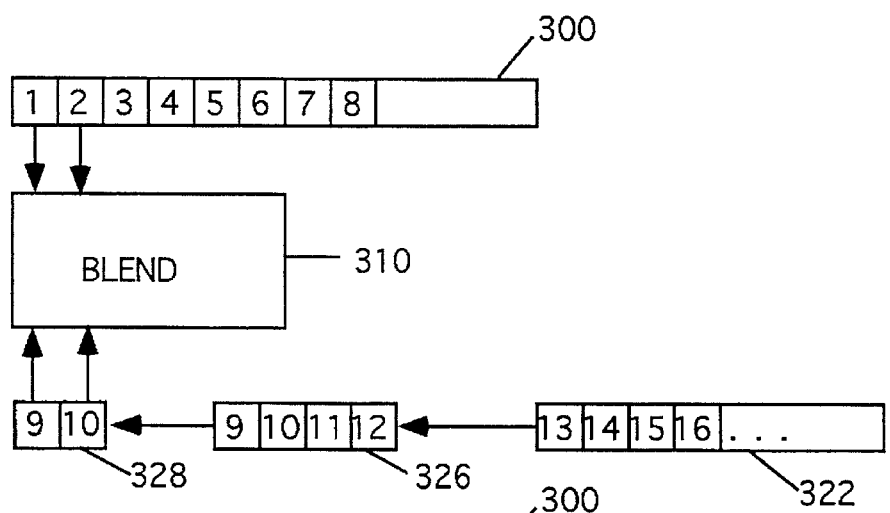

At this point, the graphics processor 130 is prepared to generate output pixels. Accordingly, the host processor 100 sets the STORE bit to 0 (step 570) and sets the DRAW bit to 1 (step 590). In response, pixel data from the second row of the source image 210 is loaded into the coordination circuitry 320. In particular, the four leftmost pixels of the second row of the source image 210, pixels 9 through 12, are loaded into the data word register 326, assuming the system is operating in 8-bit mode. In 16-bit mode, only the two leftmost pixels of the second row would be loaded into the data word register 326. However, the remainder of this description will assume operation in the 8-bit mode. The two leftmost bits of the second row of the source image, pixels 9 and 10, are also received by the C-D register 328 from the data word register 326 and stored. Loading of the correct pixel values into the C-D register 328 requires first setting the LENGTH register 340 to the number of pixels to be used in the first data word of the second row before the C-D register 328 is loaded. The LENGTH register 340 is reset to either 4 or 2 as described above after the C-D register is loaded with pixel data from the first data word and before the next data word is sent. FIG. 7B shows the contents of the scanline buffer 300, the C-D register 328, the data word register 326, and the FIFO 322 immediately before the first output pixel is generated.

Before each row of output pixels is generated, the host processor 100 stores the initial value of T1 in the INIT_T1 register 342. The blend circuitry 310 then receives input pixels A and B (which are initially pixels 1 and 2 of the source image 210) from the scanline buffer 300 and pixels C and D (which are initially pixels 9 and 10 of the source image 210) from the C-D register 328 to produce an output pixel intensify (step 650). This output intensify is provided to the frame buffer 140 (step 660). Xfrac and Yfrac are then incremented repeatedly in the manner described above, causing additional output intensifies to be generated. Xfrac is incremented by the command circuitry 339 once for each output pixel based on the value in the Xfrac_incr register 336 (step 670). Yfrac is incremented by the host processor 100 once for each row of output pixels (step 700).

Figure 7C:
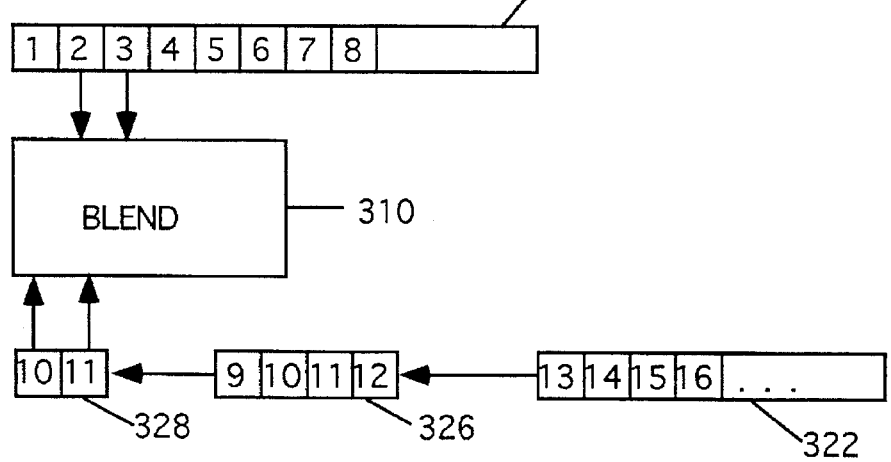

As already described, input pixels A, B, C, and D change each time Xfrac reaches 1 and each time Yfrac reaches 1, so that the next output pixel generated is based on a different block of four pixels from the source image 210. Consequently, each time Xfrac reaches 1, the contents of the C-D register 328 are modified such that the left pixel of the C-D register 328 is replaced with the right pixel of the C-D register 328, while the right pixel is replaced with the next pixel to the right in the source image 210, which is received from the data word register 326. The modified contents of the C-D register 328 are then provided to the blend circuitry 310. FIG. 7C shows the contents of the scanline buffer 300 the C-D register 328, the data word register 326, and the FIFO 322 immediately after the first time Xfrac has reached 1. Note that if Yfrac equals 0 when this change occurs, the change will have no effect on the output pixel intensity, because input pixels C and D would be attributed no weight.

Figure 7D:
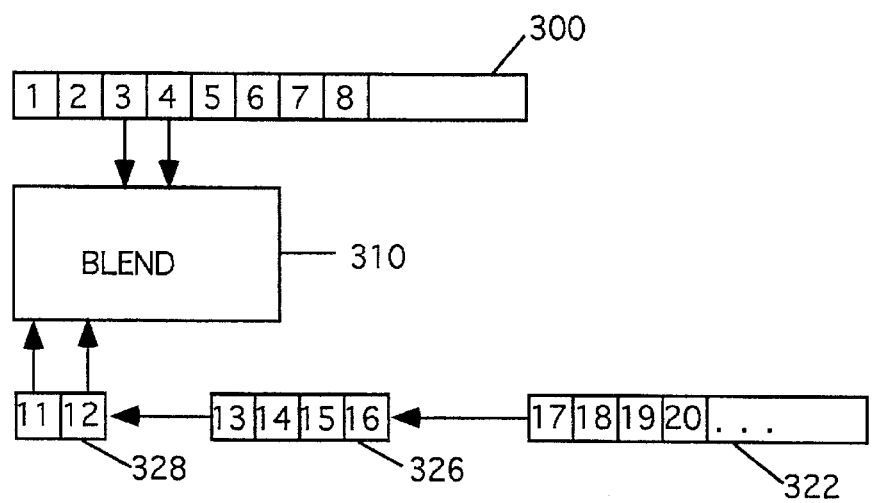
Figure 7E:
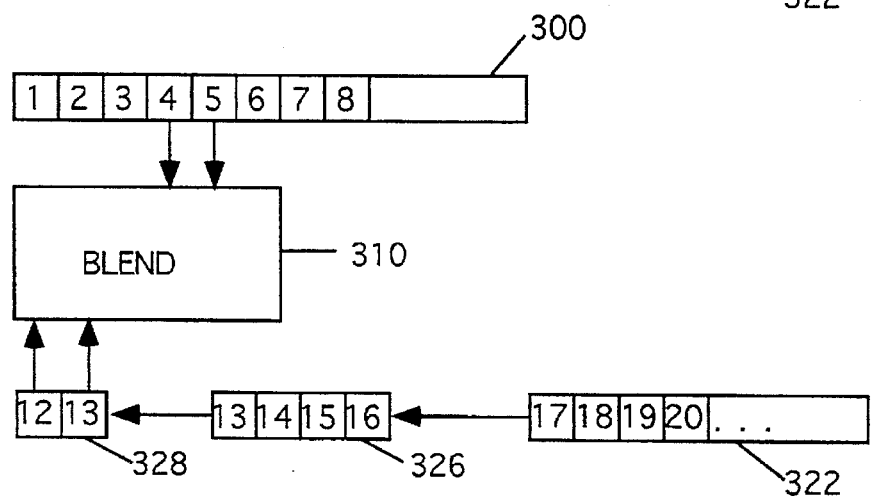

The data word register 326 is reloaded with a new data word once for each time four source image 210 pixels are stored in the C-D register 328. For example, when the fourth pixel of the second row, pixel 12, has been loaded into the C-D register 328, the data word register 326 is loaded with the next data word from the FIFO 322, comprising the next four pixels. FIG. 7D illustrates the contents of the hardware immediately after the data word register 326 has been loaded with a new data word.

In accordance with the present invention, each row of the source image 210 (except the first) may be sent from the host processor 100 to the blend coordination circuitry 320 once for each possible value of Yfrac from 0 to 1. The number of possible values of Yfrac depends upon the value Yfrac_incr, which is based on the desired vertical zoom factor. For a zoom factor of 1.0 (no enlargement), Yfrac_incr would be 1, and each source row would be sent only once. As the vertical zoom factor increases, the number of times each source row must be sent from the host processor 100 also increases. However, as discussed above, the actual implementation uses a rectangle dipper to define the boundaries of the output image. Consequently, not every row of the source image will necessarily be used to generate output, nor will every pixel in any given row necessarily be used to generate output. Instead, the host processor 100 will send to the coordination circuitry 320 only as many rows of the source image, and only as many pixels in each row, as are required to generate sufficient output pixels to fill the area defined by the dipping rectangle.

A special case occurs once for every time a row of output pixels is generated. When the two rightmost pixels of any two adjacent rows of the source image are used by the blend circuitry 310 to represent input pixels A and C (see FIG. 4), there are no source image pixels remaining to represent input pixels B and D in the blending process (see FIGS. 4F, 4L, and 4R). Therefore, the host processor 100 provides extra pixels from the complete image 200 to represent input pixels B and D. The particular pixels which the host processor 100 provides are pixels in the complete image 200 (see FIG. 2) lying just to the right of the source image 210 (i.e., just outside the zoom window) from the two rows which are currently being blended. One extra pixel is provided to the scanline buffer 300 from the upper row being blended to represent input pixel B once for each time a new scanline is stored in the scanline buffer 300. (The process for storing a new scanline in the scanline buffer 300 is described below.) One extra pixel is provided from the lower row being blended to represent input pixel D once for each time an output row is generated.

After each pixel in the scanline buffer 300 is used for the last time to represent input pixel A or B, that pixel is replaced in the scanline buffer 300 with the corresponding pixel from the next row of the source image 210 (steps 610–630). This condition occurs each time Xfrac equals or exceeds 1 at the same time that Yfrac has such a value that it will equal or exceed 1 the next time it is incremented, e.g., when $Xfrac \geq 1$ and $Yfrac \geq (1-Yfrac\_incr)$. FIG. 4 illustrates this condition for a zoom by 3.0. Yfrac equals ⅔ in FIGS. 4M through 4R. Each time Xfrac reaches 1 while Yfrac equals ⅔, as in FIGS. 4P and 4R, the pixel in the scanline buffer 300 represented by input pixel A is replaced with the pixel from the C-D register 328 represented by input pixel C. (Note that, as illustrated in FIGS. 4P and 4R, the condition Xfrac=0 is essentially the same as Xfrac=1. Xfrac is reset to 0 each time it reaches 1.) The pixel data is routed from the C-D register 328, through the blend circuitry 310, to the scanline buffer 300.

The replacement process is enabled by the host processor 100 setting the STORE bit in the control register 338 to 1 (step 580) when $Yfrac \geq (1-Yfrac\_incr)$. The command circuitry 339 reads the status of the STORE bit and initiates the replacement process each time $Xfrac \geq 1$ while the STORE bit is 1. The STORE bit remains set to 1 for one entire row of output pixels, after which the STORE bit is reset to 0 (step 570). The DRAW bit remains set to 1 while the STORE bit is set to 1 so that output pixels continue to be generated while the replacement process occurs.

Figure 8D:
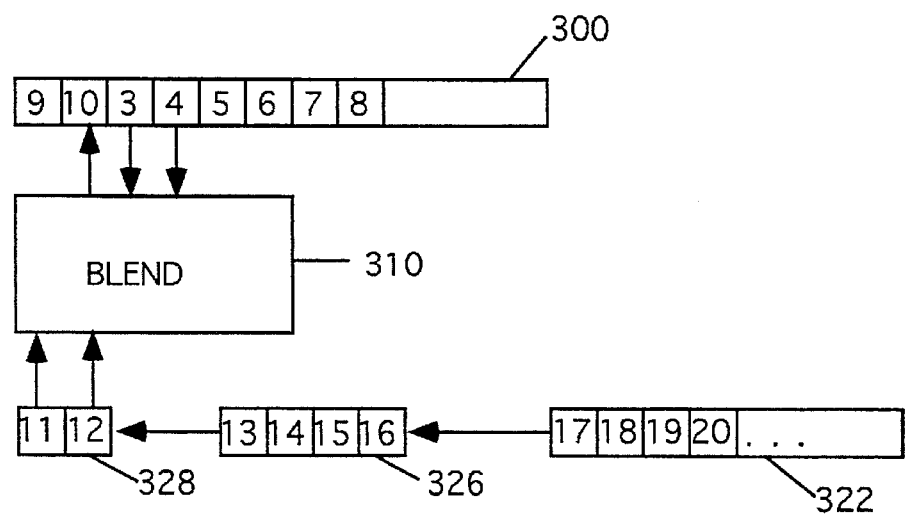
Figure 8E:
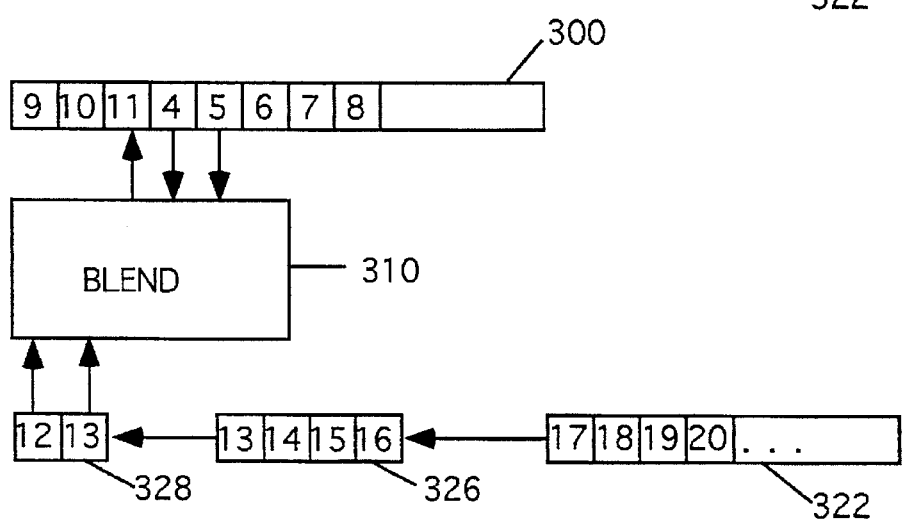

FIGS. 8A through 8E illustrate the replacement of several pixels in the scanline buffer 300 for the first time a source image row is replaced. FIG. 8A depicts the source image 210. FIG. 8B shows the contents of the scanline buffer 300, the C-D register 328, the data word register 326, and the FIFO 322 immediately before the first output pixel is generated. Each of FIGS. 8C through 8E shows the contents of these devices when $Xfrac \geq 1$ for a different input pixel while $Yfrac \geq (1-Yfrac\_incr)$. FIG. 8C shows the first occurrence of $Xfrac \geq 1$ for $Yfrac \geq (1-Yfrac\_incr)$. Accordingly, pixel 1 in the scanline buffer 300 is no longer needed and is replaced with pixel 9 from the C-D register 328. This data transfer corresponds in time to the condition represented conceptually in FIG. 4P. The contents of the C-D register 328 are then modified, as described above, so that pixel 10 takes the place in the C-D register 328 formerly occupied by pixel 9, and pixel 11 from the data word register 326 takes the place of pixel 10. FIG. 8D shows the second occurrence of $Xfrac \geq 1$ for $Yfrac \geq (1-Yfrac\_incr)$. In this case, pixel 2 in the scanline buffer 300 is no longer needed and is replaced by pixel 10 from the C-D register 328. The contents of the C-D register 328 and the data word register 326 are modified accordingly. FIG. 8E shows the third occurrence of $Xfrac \geq 1$ for $Yfrac \geq (1-Yfrac\_incr)$, when pixel 3 in the scanline buffer 300 is replaced by pixel 11 from the C-D register 328.

The process of generating output pixels and replacing pixels in the scanline buffer 300 when appropriate is then repeated, so that each row of the source image 210 is effectively stored once in the scanline buffer 300 and every pixel of the source image 210 is used to generate output pixels (except as limited by the rectangle clipper). Hence, for any given row of pixels stored in the scanline buffer 300, the pixels in the scanline buffer 300 are replaced on a piecemeal basis as output pixels are generated, rather than through a single STORE operation.

The described embodiment may be implemented such that some of the separate registers described herein are actually shared. Further, although the present embodiment has been described in terms of a monochrome source image, the present invention may also be practiced for color images. This could be accomplished by generating an output intensity level, using the same basic process as described, for each of the red, green, and blue intensity levels for each pixel of the source image. One way to achieve this result is to effectively triple the described hardware and perform the described method simultaneously for red, green, and blue for any given pixel in the source image.

Hence, a method and an apparatus for use in a graphics subsystem capable of performing both integral and non-integral zooming has been described. The described method and apparatus provide integral and non-integral zooming in a manner which reduces the amount of resident memory required in a graphics processor while also reducing data traffic on the system bus.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for enlarging a source image for display on a display device, the apparatus comprising:

a scanline buffer for storing pixel values of a first row of the source image;

coordination circuitry for receiving and storing pixel values of a second row of the source image;

blend circuitry coupled to the scanline buffer and the coordination circuitry, the blend circuitry for generating output pixel values, each of the output pixel values corresponding to a weighted average of a plurality of input pixel values, the plurality of input pixel values comprising a plurality of pixel values stored in the scanline buffer and a plurality of pixel values stored in the coordination circuitry; and control circuitry coupled to the scanline buffer, the coordination circuitry, and the blend circuitry, the control circuitry for determining weight values for computing the weighted average.

2. The apparatus of claim 1, wherein the weight values comprise:

a value Xfrac representing a horizontal component of the weighted average; and a value Yfrac representing a vertical component of the weighted average, wherein Xfrac is incremented by a predetermined value Xfrac_incr once for each time an output pixel value is generated by the blend circuitry and Yfrac is incremented by a predetermined value Yfrac_incr once for each time the blend circuitry generates a complete row of output pixel values, wherein Xfrac_incr corresponds to a factor by which the source image is to be enlarged along a horizontal axis, and wherein Yfrac_incr corresponds to a factor by which the source image is to be enlarged along a vertical axis.

3. The apparatus of claim 2, wherein Xfrac is incremented by a predetermined value Xfrac_incr once for each time an output pixel value is generated by the blend circuitry and Yfrac is incremented by a predetermined value Yfrac_incr once for each time the blend circuitry generates a complete row of output pixel values.

4. The apparatus of claim 3, wherein Xfrac_incr corresponds to a factor by which the source image is to be enlarged along a horizontal axis.

5. The apparatus of claim 3, wherein Yfrac_incr corresponds to a factor by which the source image is to be enlarged along a vertical axis.

6. The apparatus of claim 3, wherein the input pixel values comprise two input pixel values from the scanline buffer and two input pixel values from the coordination circuitry, and wherein the control circuitry replaces a first of the two input pixel values from the scanline buffer with a first of the two input pixel values from the coordination circuitry when Xfrac exceeds a first predetermined value and Yfrac exceeds a second predetermined value.

7. The apparatus of claim 2, wherein the weighted average is computed according to the formula:

$$T1=A+Yfrac(C-A)$$

$$T2=B+Yfrac(D-B)$$

$$OUTPUT=T1+Xfrac\,(T2-T1)$$

wherein

A represents a first of the input pixel values from the stored scanline;

B represents a second of the input pixel values from the stored scanline;

C represents a first of the input pixel values from the coordination circuitry;

D represents a second of the input pixel values from the stored scanline; and

OUTPUT represents the output pixel value.

8. The apparatus of claim 7, wherein a pixel represented by A is horizontally adjacent to a pixel represented by B, a pixel represented by C is horizontally adjacent to a pixel represented by D, and the second row of the source image is vertically adjacent to the first row of the source image.

9. The apparatus of claim 1, wherein the control circuitry is further for determining a plurality of weight values and for determining, based on the weight values, which pixel values stored, in the scanline buffer and in the coordination circuitry are used by the blend circuitry as the input pixel values.

10. The apparatus of claim 9, wherein the control circuitry is further for replacing the pixel values stored in the scanline buffer with corresponding pixel values stored in the coordination circuitry after the last time the pixel values stored in the scanline buffer are used as input pixel values.

11. An apparatus for enlarging a source image on a computer display, comprising:

a scanline buffer for storing a scanline, the scanline comprising pixel values for each pixel in a first row of the source image, the source image having a plurality of rows of pixels, each of the rows having P pixels, where P is an integer;

a memory device coupled to a processor for receiving from the processor pixel values of pixels in a second row of the source image;

a data word register coupled to the memory device for receiving from the memory device and storing data words, each data word corresponding to at least one of the pixels of the second row of the source image;

a C-D register coupled to the data word register for receiving and storing pixel values of the Nth pixel and the (N+1)th pixel of the second row of the source image, where N is an integer;

blending circuitry coupled to the C-D register and the scanline buffer for generating output pixel values of an output image, each of the output pixel values representing a weighted average of a plurality of input pixel values, the plurality of input pixel values comprising the Nth and (N+1)th pixel values of the scanline, and the Nth and (N+1)th pixel values of the second row of the source image stored in the coordination circuitry, and control circuitry coupled to the scanline buffer, the blending circuitry, the C-D register, and the data word register, the control circuitry storing values Xfrac and Yfrac to be used by the blending circuitry in computing the weighted average, the control circuitry incrementing Xfrac by a predetermined value Xfrac_incr each time the blending circuitry generates an output pixel value, such that N is incremented by one each time Xfrac exceeds a first predetermined value and N is reset to one if N exceeds P, the control circuitry resetting Xfrac to a second predetermined value if Xfrac exceeds the first predetermined value, the control circuitry causing the pixel value of the Nth pixel of the scanline to be replaced with the pixel value of the Nth pixel of the second row of the source image stored in the coordination circuit after the blending circuitry generates the last output intensity level for which the Nth pixel value of the scanline is used as one of the input pixel values, the control circuitry incrementing Yfrac by a predetermined value Yfrac_incr once each time the blending circuitry generates a complete row of output pixel values, such that the second row of the source image is replaced by the next vertically adjacent row of the source image each time Yfrac exceeds a fourth predetermined value, the control circuitry resetting Yfrac to a third predetermined value if Yfrac exceeds the fourth predetermined values.

12. The apparatus of claim 11, wherein N is initially one.

13. The apparatus of claim 11, wherein the weighted average is computed by the blending circuitry according to the formula:

$$T1=A+Yfrac(C-A)$$

$$T2=B+Yfrac(D-B)$$

$$OUTPUT=T1+Xfrac\,(T2-T1)$$

wherein

A represents the Nth pixel value of the scanline;

B represents the (N+1)th pixel value of the scanline;

C represents the Nth pixel value of the Mth row of the source image; and

D represents the (N+1)th pixel value of the Mth row of the source image; and

OUTPUT represents the output pixel value.

14. The apparatus of claim 11, wherein the control circuitry comprises:

an Xfrac register for storing Xfrac, Xfrac representing a horizontal component of a weighted intensity of one of the input pixel values;

a Yfrac register for storing Yfrac, Yfrac representing a vertical component of the weighted intensity of one of the input pixel values; and an Xfrac_incr register for storing Xfrac_incr, Xfrac_incr corresponding to a factor by which the source image is to be enlarged horizontally.

15. The apparatus of claim 14, wherein the control circuitry further comprises:

a control register for storing a STORE bit and a DRAW bit, the DRAW bit for enabling the blending circuitry to generate the output pixel value, the STORE bit for enabling the Nth pixel value of the scanline to be replaced with the Nth pixel value of the second row of the source image stored in the coordination circuit; and a command circuit for causing Xfrac to be incremented, for causing the Nth pixel value of the scanline to be replaced with the the Nth pixel value of the second row of the source image stored in the coordination circuit when the STORE bit has a fifth predetermined value, and for enabling the blending circuitry to generate the output intensity level when the DRAW bit has a sixth predetermined value.

16. The apparatus of claim 11, wherein the processor is a central processing unit (CPU) of a computer.

17. A method of enlarging a source image on a video display, comprising the steps of:

a) storing in a storage buffer pixel values of a single row of the source image received from a processor;
 b) determining weight values corresponding to factors by which the source image is to be enlarged;
 c) providing to a blend circuit a plurality of sets of input pixel values, each of the sets of input pixel values comprising two pixel values stored in the storage buffer and two pixel values from a second row of the source image received from the processor;
 d) determining based on the weight values which of the pixel values in the storage buffer and in the second row of the source image are to be included in each of the sets of input pixel values;
 e) using the blend circuit to generate a plurality of output pixel values, each of the output pixel values corresponding to a weighted average of one of the sets of input pixel values; and
 f) replacing predetermined pixel values in the storage buffer with corresponding pixel values from the second row of the source image, each of the predetermined pixel values being replaced after the blend circuit has generated the last output pixel value for which the predetermined pixel value was used as an input pixel value wherein the predetermined pixel values are determined based on the weight values;
 g) repeating steps b) through f) such that the pixel value of each pixel of the source image is used by the blend circuit in at least one of the sets input pixel values for generating at least one of the output pixel values.

18. The method of claim 17, wherein the weight values comprise:

a value Xfrac corresponding to a horizontal component of the weighted average; and
 a value Yfrac corresponding to a vertical component of the weighted average.

19. The method of claim 17, wherein Xfrac is incremented by a predetermined value Xfrac_incr once for each time an output pixel value is generated by the blend circuit and Yfrac is incremented by a predetermined value Yfrac_incr once for each time the blend circuit generates a complete row of output pixel values.

20. The method of claim 19, wherein Xfrac_incr corresponds to a factor by which the source image is to be enlarged horizontally, and wherein Yfrac_incr corresponds to a factor by which the source image is to be enlarged vertically.

21. The method of claim 17, wherein the weighted average is computed according to the formula:

$$T1 = A + Yfrac(C-A)$$

$$T2 = B + Yfrac(D-B)$$

$$OUTPUT = T1 + Xfrac(T2-T1)$$

wherein

A represents a first of the two pixel values stored in the storage buffer;
 B represents a second of the two pixel values stored in the storage buffer;
 C represents a first of the two pixel values from the second row of the source image;
 D represents a second of the two pixel values from the second row of the source image; and
 OUTPUT represents the output pixel value.

22. The method of claim 21, wherein a pixel represented by A is horizontally adjacent to a pixel represented by B in the source image, a pixel represented by C is horizontally adjacent to a pixel represented by D in the source image, and the second row of the source image is vertically adjacent to the first row of the source image.

23. The method of claim 17, wherein the first of the two input pixel values from the storage buffer is replaced by the first of the two input pixel values from the second row of the source image when Xfrac exceeds a first predetermined value and Yfrac exceeds a second predetermined value.

24. The method of claim 17, further comprising the step of providing each of the output pixel values generated by the blend circuit to a frame buffer.

25. The method of claim 17, wherein the processor is a central processing unit (CPU) of a computer.

26. An apparatus for enlarging a source image, comprising:

a buffer for storing pixel values of a single row of the source image;
 a first circuit for receiving from a processor and storing pixel values of a second row of the source image;
 a second circuit coupled to the buffer and the first circuit, the second circuit for generating output pixel values, each of the output pixel values corresponding to a weighted average of a plurality of input pixel values; and
 a third circuit coupled to the buffer, the first circuit, and the second circuit, the third circuit for determining the weighted average.

27. In a computer system including a processor and a display device, a method of enlarging a source image for display by the display device, the method comprising the steps of:

a) receiving pixel values of a single row of the source image from the processor;
 b) storing the pixel values of the single row of the source image in a storage buffer;
 c) receiving pixel values of a second row of the source image from the processor;
 d) determining weight values corresponding to factors by which the source image is to be enlarged;
 e) determining, based on the weight values, which of the pixel values in the storage buffer and in the second row of the source image are to be used as input pixel values for generating each of a plurality of output pixel values; and
 f) generating the plurality of output pixel values, each of the output pixel values corresponding to a weighted average of a set of the input pixel values.

28. The method of claim 27, further comprising the step of:

(g) replacing predetermined pixel values in the storage buffer with corresponding pixel values from the second row of the source image, each of the predetermined pixel values being replaced after generating the last output pixel value for which the predetermined pixel value was used as an input pixel value.

29. The method of claim 28, further comprising the step of:

h) repeating steps a) through g) such that each pixel value of the source image is used in at least one set of input pixel values for generating at least one of the output pixel values.

30. An apparatus for enlarging a source image for display on a display device, the apparatus comprising:

buffer means for storing pixel values of only a first row of the source image;

coordination means for receiving from a processor and storing pixel values of a second row of the source image;

blend means for generating a plurality of output pixel values, each of the output pixel values representing a weighted average of a plurality of input pixel values, the plurality of input pixel values comprising a plurality of the pixel values stored in the buffer means and a plurality of the pixel values stored in the coordination means; and control means for providing weight values to the blend means corresponding to the weighted average and for determining which pixels stored in the buffer means and in the coordination means are used by the blend means as the input pixel values.

31. The apparatus of claim 30, wherein the control means is further for replacing the pixel values stored in the buffer means with corresponding pixel values from the coordination means after the last time the pixel values in the buffer means are used as input pixel values.

* * * * *